United States Patent [19]

Sepstrup

[11] Patent Number: 4,717,097
[45] Date of Patent: Jan. 5, 1988

[54] AIRCRAFT WINGS WITH AILERON-SUPPORTED GROUND SPEED SPOILERS AND TRAILING EDGE FLAPS

[75] Inventor: James L. Sepstrup, King County, Wash.

[73] Assignee: The Boeing Company, Seattle, Wash.

[21] Appl. No.: 835,804

[22] Filed: Mar. 3, 1986

[51] Int. Cl.[4] .............................................. B64C 9/34
[52] U.S. Cl. .................................... 244/217; 244/215; 244/90 R; 244/90 A
[58] Field of Search ............. 244/213, 215, 217, 90 R, 244/90 A, 110 D

[56] References Cited

U.S. PATENT DOCUMENTS

| | | |
|---|---|---|
| 1,504,663 | 5/1921 | Wright et al. . |
| 1,841,804 | 4/1930 | Hall . |
| 1,992,157 | 11/1932 | Hall . |
| 2,136,845 | 11/1938 | Fenton . |
| 2,137,382 | 11/1938 | Blaylock et al. . |
| 2,138,326 | 11/1938 | Pouit . |
| 2,152,974 | 4/1939 | Riviere . |
| 2,156,403 | 5/1939 | Riviere . |
| 2,158,092 | 5/1939 | Taylor .................................. 244/213 |
| 2,254,304 | 9/1941 | Miller . |
| 2,344,945 | 7/1942 | Knox et al. . |
| 2,407,401 | 9/1946 | Clauser et al. . |
| 2,422,035 | 6/1947 | Noyes, Jr, . |
| 2,427,980 | 9/1947 | Stinson et al. . |
| 2,445,833 | 7/1948 | Kraemer et al. . |
| 2,476,001 | 7/1949 | Stalker . |
| 2,501,726 | 3/1950 | Knox . |
| 2,582,348 | 1/1952 | Northrop et al. . |
| 2,612,329 | 9/1952 | Crandall et al. . |
| 2,665,084 | 1/1954 | Feeney et al. . |
| 2,791,385 | 5/1957 | Johnson . |
| 2,927,469 | 3/1960 | Czerwinski . |
| 3,041,014 | 6/1962 | Gerin . |
| 3,120,935 | 1/1964 | Perrin . |
| 4,003,533 | 1/1977 | Carter et al. . |
| 4,049,219 | 9/1977 | Dean et al. . |

FOREIGN PATENT DOCUMENTS

| | | |
|---|---|---|
| 877353 | 12/1942 | France . |
| 1059747 | 3/1954 | France . |
| 727002 | 3/1955 | United Kingdom ................. 244/217 |
| 940815 | 11/1963 | United Kingdom ................. 244/215 |

Primary Examiner—Jeffrey V. Nase
Assistant Examiner—Rodney Corl
Attorney, Agent, or Firm—Hughes & Cassidy

[57] ABSTRACT

Aileron-supported split flaps and ground speed spoilers (collectively referred to as "aerodynamic lifting or braking devices") for reducing aircraft approach speeds and reducing the length of the runway needed to land the aircraft. The actuating mechanism for the aerodynamic lifting or braking device allows the latter to rotate with the supporting aileron as the latter is moved up and down when the lifting or braking device is in its stowed position. When the lifting or braking device is in its extended position, up and down aileron movements will cause the aerodynamic lifting or braking device to translate to and fro, but the lifting or braking device will remain in the extended position, irrespective of aileron movement. Hydraulic and torque tube systems can be used to deflect the aerodynamic lifting or braking device which completes the aerodynamic profile of the supporting aileron when that device is in its stowed position.

11 Claims, 8 Drawing Figures

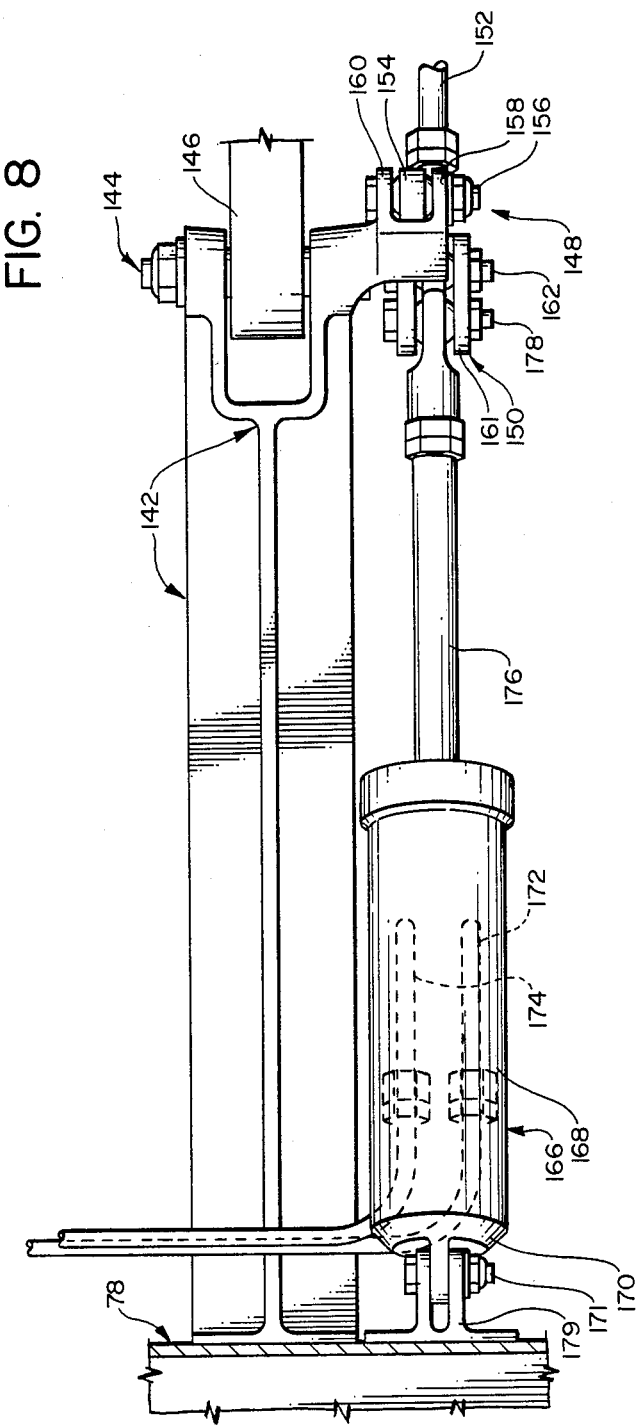

AIRCRAFT WINGS WITH AILERON-SUPPORTED GROUND SPEED SPOILERS AND TRAILING EDGE FLAPS

FIELD OF THE INVENTION

The present inventions relate to aircraft wings and, more specifically, to novel, improved aircraft wings which have aileron-associated spoilers and trailing edge flaps for reducing approach speeds and decreasing runway lengths needed for landings by increasing the lift and drag on aircraft equipped with one or both of the foregoing inventions. The flaps provide additional aerodynamic lift for reducing approach speeds, and the spoilers provide additional aerodynamic drag for ground speed braking.

For the sake of convenience, spoilers and flaps embodying the principles of the present invention are on occasion collectively referred to herein as "aerodynamic lifting or braking devices."

BACKGROUND OF THE INVENTION

As the development of modern, high speed aircraft proceeds, there is a continuing demand for reduced approach speeds and decreased landing lengths so that aircraft landing performance will be compatible with existing runway facilities and/or other aircraft in the same fleet and with military and other applications in which conditions may dictate that shorter than optical runways be employed.

Several proposals for reducing approach speeds and landing distances have been made. Among these are: improved anti-skid braking systems, modifications to existing flap and spoiler systems, low pressure tires and wheels, thrust gate modifications, installation of nose gear brakes, and forward center-of-gravity restrictions.

Still other methods of providing additional lift in the flaps down configuration have been tried. These, using the aileron as a flap, include the use of flaperons and drooping the aileron. Approaches like these are too ineffective or too complicated to be practical.

SUMMARY OF THE INVENTION

I have now developed two novel solutions to the problems of decreasing approach speeds and reducing the runway length needed to land an aircraft. Both are free of the disadvantages of many heretofore proposed solutions to these problems—ineffectiveness and undue complexity.

One of my solutions to the problems posed above involves the use of trailing edge flaps mounted on the bottom of an aircraft's ailerons, the other solution the employment of aileron-mounted ground spoilers designed to fit into the upper surface of the aileron.

In both cases the aerodynamic lifting or braking device will typically extend the full span of the aileron on which it is mounted. A novel crank and support rod mechanism so actuates the lifting or braking device for pivotal movement relative to the wing with which it is associated that: (1) when the lifting or braking device is in its retracted (or stowed) position, it pivots with its companion aileron, and (2) the aileron can be displaced essentially without disturbing the angle of the lifting or braking device when the latter is extended. The actuating mechanism accomplishes these goals by centering the pivot axis of the lifting or braking device on the pivot axis of the aileron when the lifting or braking device is stowed and by so locating the pivot axis of the extended lifting or braking device relative to that of the aileron that the lifting or braking device can move fore and aft but will not vary in angular displacement by more than a few degrees as the associated aileron is moved up and down when the lifting or braking device is in its extended position.

Depending upon the type of aerodynamic lifting or braking device that is employed, either the upper or lower surface of the aileron will be recessed to house the lifting or braking device with the exposed surface of the stowed lifting or braking device continuing the airfoil configuration of the aileron. Piano hinges or the equivalent are employed to pivotably connect the leading edge of the aerodynamic lifting or braking device to the aileron with which it is associated.

THE PRIOR ART

Devices which superficially resemble the novel aerodynamic lifting or braking devices invented by applicant are disclosed in the following U.S. and French patents.

| U.S. Pat. No. | Patentee(s) | Issue Date |
| --- | --- | --- |
| 1,504,663 | O. Wright et al. | Aug. 12, 1924 |
| 1,841,804 | R. F. Hall | Jan. 19, 1932 |
| 1,992,157 | R. F. Hall | Feb. 19, 1935 |
| 2,136,845 | G. B. Fenton | Nov. 15, 1938 |
| 2,137,382 | R. C. Blaylock et al. | Nov. 22, 1938 |
| 2,138,326 | R. Pouit | Nov. 29, 1938 |
| 2,156,403 | H. Riviere | May 2, 1939 |
| 2,152,974 | H. Riviere | April 4, 1939 |
| 2,254,304 | W. H. Miller | Sept. 2, 1941 |
| 2,344,945 | T. Knox et al. | Mar. 28, 1944 |
| 2,407,401 | F. H. Clauser et al. | Sept. 10, 1946 |
| 2,422,035 | J. Noyes, Jr. | June 10, 1947 |
| 2,427,980 | W. E. Stinson et al. | Sept. 23, 1947 |
| 2,445,833 | R. W. Kraemer et al. | July 27, 1948 |
| 2,476,001 | E. A. Stalker | Jul. 12, 1949 |
| 2,501,726 | T. Knox | Mar. 28, 1950 |
| 2,582,348 | J. K. Northrop et al. | Jan. 15, 1952 |
| 2,612,329 | R. E. Crandall et al. | Sept. 30, 1952 |
| 2,665,084 | T. A. Feeney et al. | Jan. 5, 1954 |
| 2,791,385 | C. L. Johnson | May 7, 1957 |
| 2,927,469 | W. Czerwinski | Mar. 8, 1960 |
| 3,041,014 | J. Jean-Marie Jules Gerin | June 26, 1982 |
| 3,120,935 | J. J. F. Perrin | Feb. 11, 1964 |
| 4,003,533 | G. T. Carter et al. | Jan. 18, 1977 |
| 4,049,219 | R. D. Dean et al. | Sep. 20, 1977 |

| French Patent Number | Patentee(s) | Publication Date |
| --- | --- | --- |
| 877.353 | Junkers Flugzeug Und Motorenwerke Aktiengesellschaft | Dec. 4, 1942 |
| 1.059.747 | Societe Nationale De Constructions Aeronautiques Du Nord | Mar. 26, 1954 |

It is significant, however, that none of the prior art patents identified above are concerned with the specific problems solved by applicant. Nor do they disclose devices which would satisfactorily solve those problems. For example, with the possible exception of French Pat. No. 1,059,747, the identified prior art does not disclose an aileron mounted flap or ground spoiler which remains at essentially the same angle when deployed despite up and down movement of the supporting aileron, a criteria deemed necessary for the aerodynamic lifting or braking devices disclosed herein to be effective. Furthermore, the devices disclosed in many of those patents are more complex than I consider desirable.

OBJECTS OF THE INVENTION

From the foregoing it will be apparent to the reader that the primary object of the invention resides in the provision of novel, improved aerodynamic lifting or braking devices for reducing aircraft approach speeds and for decreasing the length of the runway needed to land those aircraft.

Other also important but more specific objects of my invention reside in the provision of aerodynamic lifting or braking devices as described in the preceding paragraphs which:
  are effective;
  are relatively uncomplicated;
  are aileron-housed and -supported flaps and ground spoilers.

Other important objects and features and additional advantages of my invention will be apparent to the reader from the foregoing and the appended claims and as the ensuing detailed description and discussion proceeds in conjunction with the accompanying drawing.

BRIEF DESCRIPTION OF THE DRAWING

In the drawing:

FIG. 8 is a view similar to FIG. 5 of the actuating mechanism and operating system for the spoiler.

DETAILED DESCRIPTION OF THE INVENTION

Figure 1:
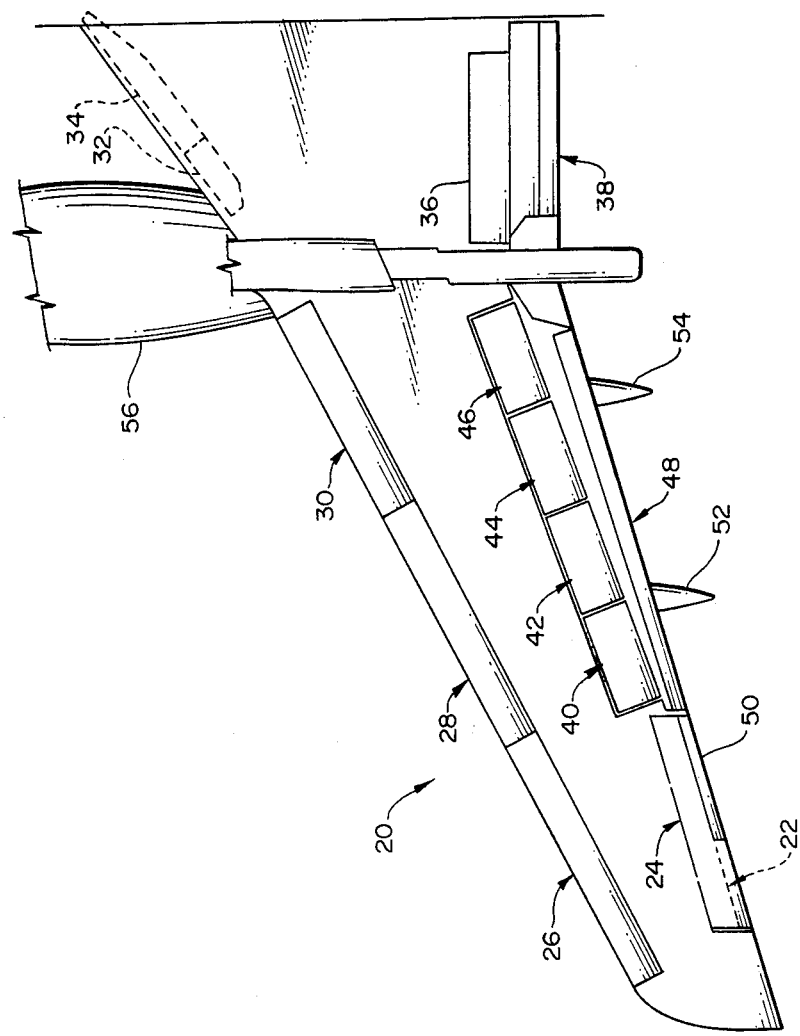
FIG. 1 is a plan view of a jet aircraft wing which can be equipped with a lift or drag generating, aileron-associated aerodynamic lifting or braking device in accord with the principles of the present invention.

Referring now to the drawing, FIG. 1 depicts a jet aircraft wing 20 equipped with an aileron-mounted, aerodynamic lifting device in accord with the principles of the present invention. In wing 20, this device is a split flap 22 which fits into a recess 23 on the lower side of aileron 24 when the flap is in its stowed (or retracted) position.

In addition to the novel aerodynamic lifting device just described, wing 20 includes, among other components: outboard leading edge slats 26, 28 and 30; inboard leading edge and Krueger flap installations 32 and 34; an inboard ground spoiler 36; an inboard flap installation 38; outboard ground spoilers 40 and 42 operated by the same hydraulic system as inboard ground spoiler 36; flight spoilers 44 and 46; an outboard flap installation 48; an aileron trim tab 50; fairings 52 and 54 housing tracks (not shown) on which the flaps in outboard flap installation 48 are extended and retracted; and an engine nacelle 56. These just-enumerated components of wing 20 are not part of the present invention and will accordingly not be described herein except as is necessary for an understanding of that invention.

Figure 2:
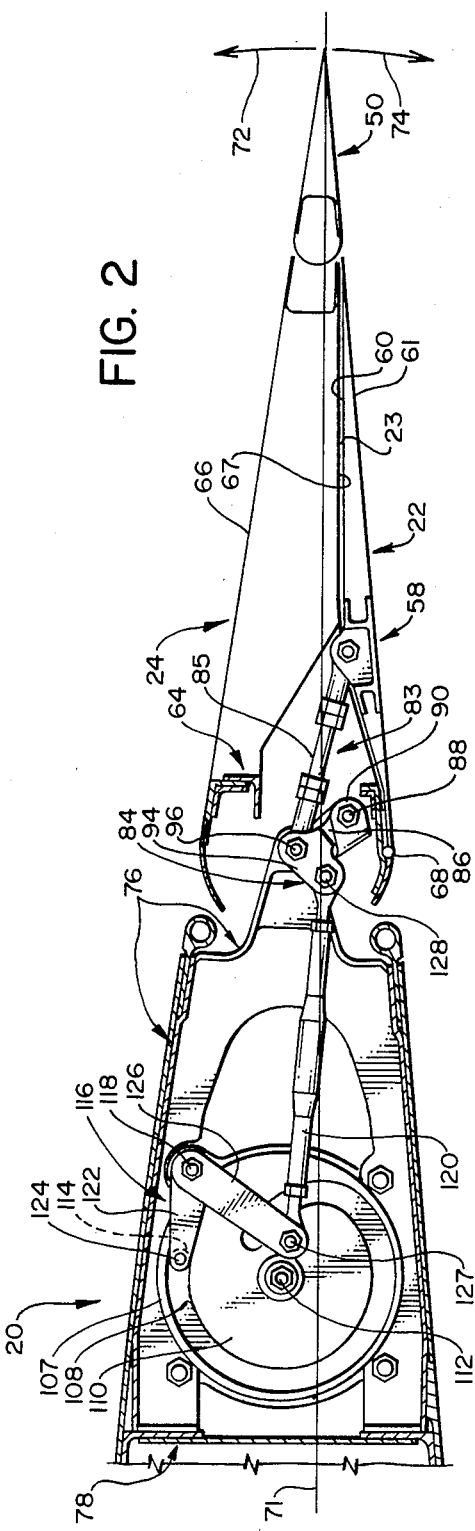
FIG. 2 is a vertical section through the wing of FIG. 1 showing the details of an aileron mounted, lift generating flap embodying the principles of my invention, the flap actuating mechanism and the system employed to operate the latter.
Figure 3:
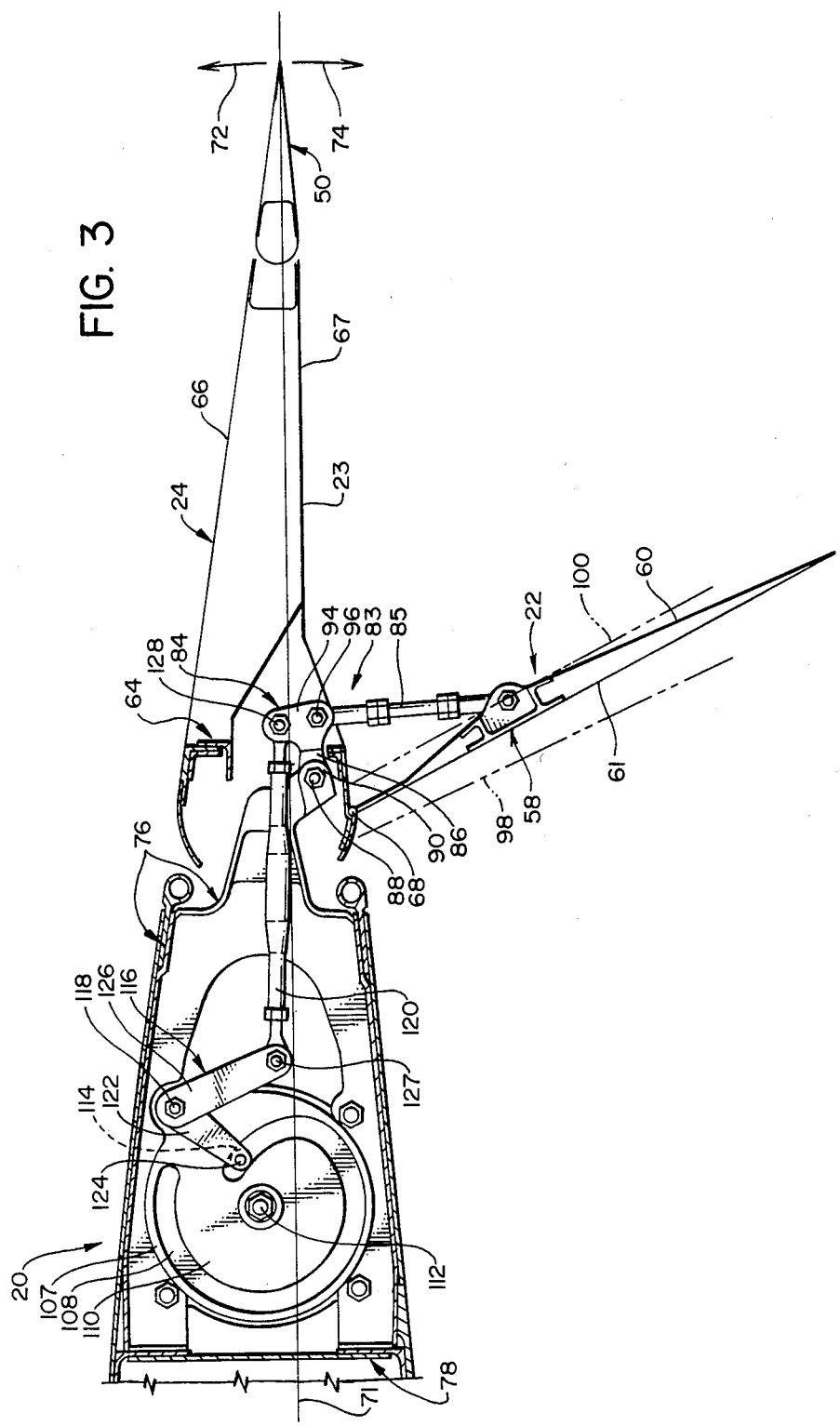
FIG. 3 is a view similar to FIG. 2 but with the flap in its extended position.

Referring still to the drawing, FIGS. 2 and 3 depict, in more detail, aileron 24 and the novel aileron-mounted, split flap 22 incorporated into wing 20 to increase the lift on the aircraft with which the wing is fitted.

Flap 22 has a structural framework or core identified generally in FIGS. 2 and 3 by reference character 58. This core is surrounded by a metallic or other upper skin 60 and a similar lower skin 61.

Aileron 24 has an aerodynamic profile and, like flap 22, a core or structural framework 64, an upper skin 66, and a lower skin 67. With flap 22 stowed in recess 23, the lower skin 61 of the flap forms part of (or continues) the aerodynamic profile of aileron 24.

Split flap 22 will typically have a constant chord and extend the length of aileron 24. At its leading edge, flap 22 is pivotably fixed to aileron 24 as by a conventional piano hinge 68.

Aileron trim tab 50 is also pivotably connected to aileron 24, in this case at the trailing edge of the latter. This wing component, which can be pivotably deflected both upwardly and downwardly, is employed to balance the forces on aileron 24 and thereby reduce the effort required to vertically deflect the aileron. As indicated above, the trim tab is not part of my present invention; I accordingly deem it unnecessary to describe this component further herein.

Referring now to FIGS. 2–5, the assembly of aileron 24, split flap 22, and aileron trim tab 50 is supported from the trailing edge of wing 20 for up and down angular movement (shown by arrows 72 and 74 in FIGS. 2 and 3) relative to the chord plane 71 of the wing from an aileron hinge support 76. The latter is mounted on the rear spar 78 of wing 20. A pin 80 (see FIG. 4) extends through hinge support 76 and the hinge lug 82 of the aileron (the aileron actuator and its support mechanism are not shown). The hinge lug is integrated with the core 64 of the aileron, and the just-described pin 80 consequently affords the wanted pivotal connection between aileron 24 and the wing 20 in which tha aileron is incorporated.

With flap 22 in the stowed position (FIG. 2) the pivot axis of aileron 24 relative to wing 20 is directly above the pivot axis between split flap 22 and aileron 24 provided by piano hinge 68.

Figure 4:
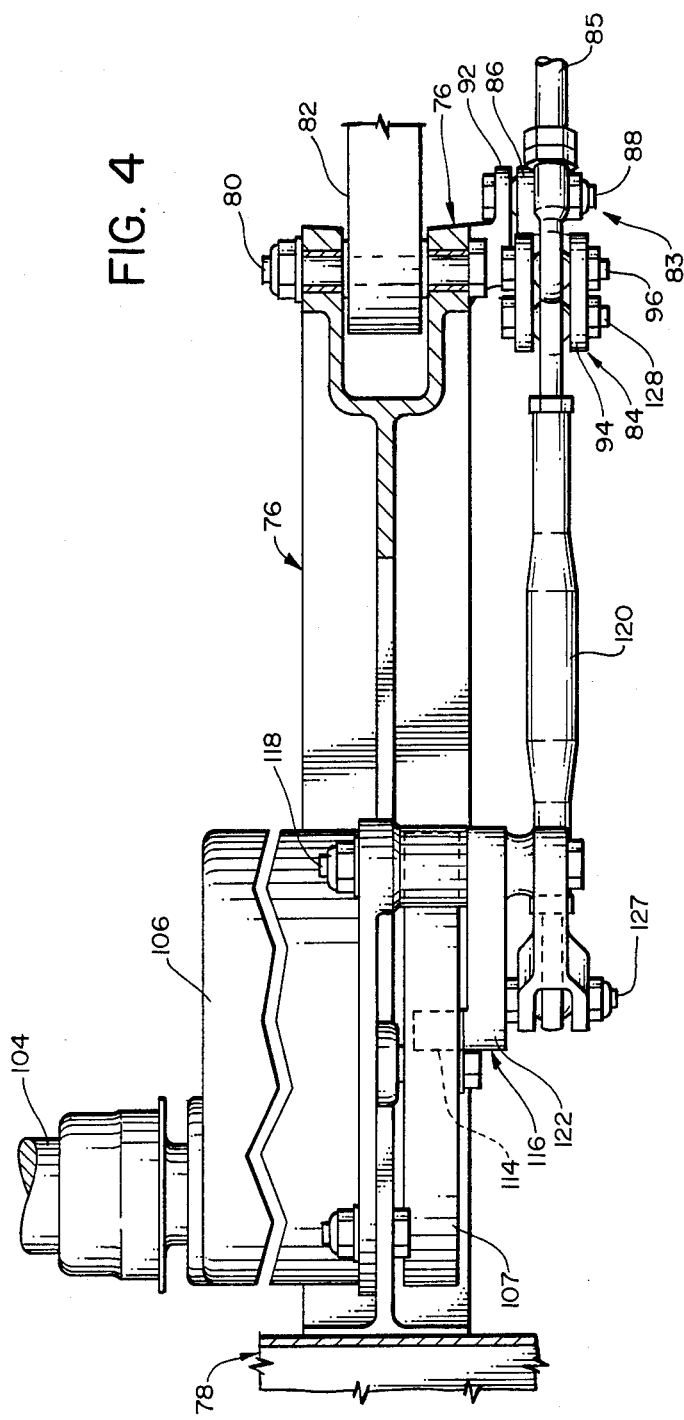
FIG. 4 is a plan view showing details of the flap actuating mechanism and the system employed to operate that mechanism.
Figure 5:
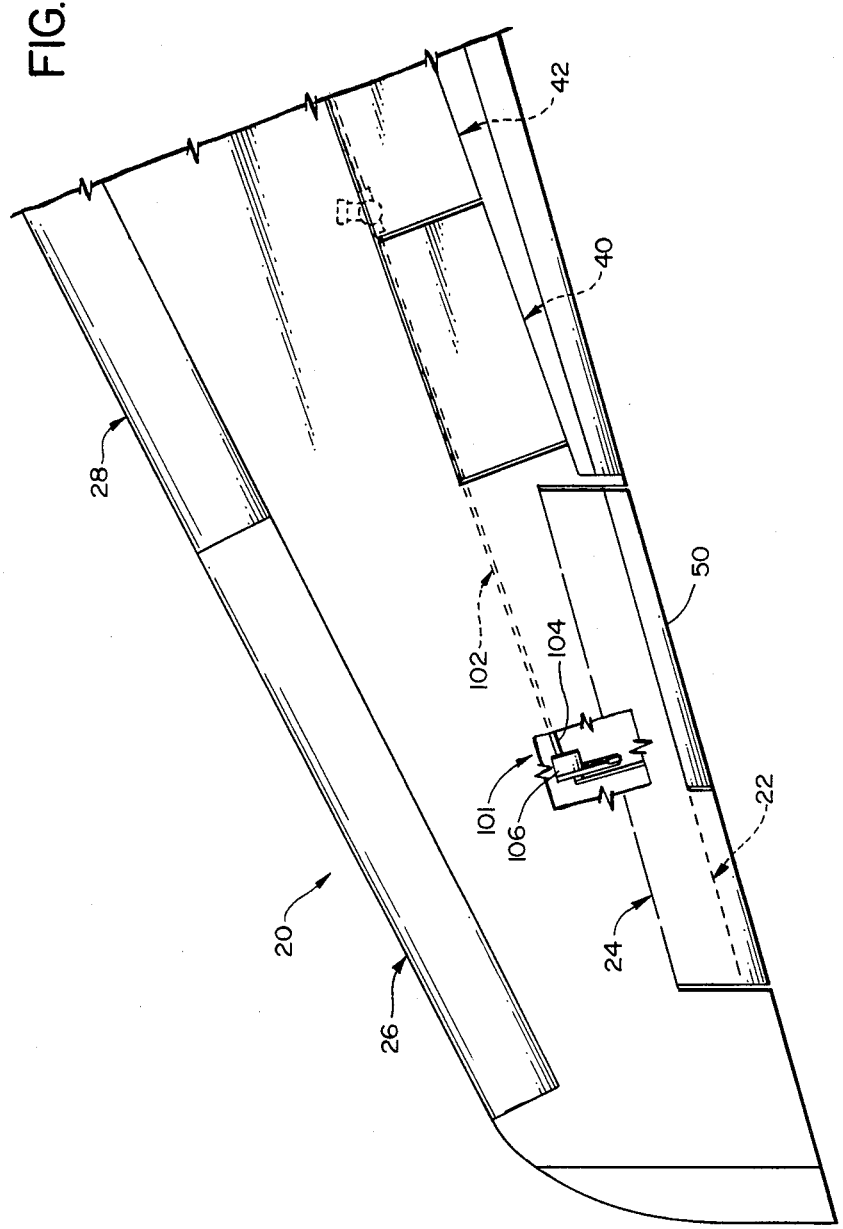
FIG. 5 is a plan view of the wing's outboard panel showing more details of the system provided for operating the flap actuating mechanism.

As can best be understood by reference to FIGS. 2–4, flap 22 is displaced between the stowed position shown in FIG. 2 and the extended, lift creating position shown in FIG. 3 in which it is displaced below and at an angle to the chord plane 71 of wing 20 by a crank-and-rod type, split flap actuating linkage or mechanism 83. That linkage includes a crank 84 and a flap support rod 85. At its free end, one arm 86 of crank 84 is pivotably fixed to aileron hinge support 76 by a pivot pin 88. The pin extends through integral flanges 90 and 92 which are integral parts of, and located at the trailing edge of support 76 and on opposite sides of crank arm 86 (through which pin 88 also extends).

Crank 84 also includes a second, bifurcated arm 94. The forward end of split flap support rod 85 is pivotably connected to crank 84 at the juncture between that bifurcated arm and crank arm 86 by a pivot member 96 best shown in FIGS. 2 and 3.

With flap 22 in the stowed position shown in FIG. 2, the pivot axis afforded by pin 96 is centered on (i.e., coincides with) the pivot axis for aileron 24 provided by pivot member or pin 80. Consequently, split flap 22 rotates as one with aileron 24 as the latter is deflected upwardly and downwardly through the paths indicated by arrows 72 and 74.

To extend flap 22, crank 84 is rotated in a clockwise direction about pivot member 88 from the position shown in FIG. 2 to that shown in FIG. 3. This deflects flap 22 downwardly through an angle which will typically be a nominal 60° relative to the chord plane 71 of wing 20.

In the extended position flap 22 will typically remain within 3° of the nominal angle as aileron 22 is moved upwardly and downwardly. However, because of the piano hinge connection 68 between the split flap and the aileron, flap 22 will translate to and fro as the aileron is moved. Broken lines 98 and 100 in FIG. 3 show the locations of the lower face or skin 61 of the flap with aileron 24 in its maximum (20° down and 20° up) positions.

Referring still to the drawings, FIGS. 2–5 depict the operating system 101 utilized to rotate crank 84 about pivot member 88 and thereby deflect split flap 22 between its stowed and extended positions.

Split flap operating system 101 includes a torque tube drive 102 which services the inboard and outboard flap installations 38 and 48 of wing 20. The operating system is housed in, and near, the trailing edge of wing 20.

An extension 104 of the torque tube drives a reduction gear box 106 which is housed in wing 20 opposite split flap 22. As is best shown in FIGS. 2–4, a drum 107 with a cam track 108 formed in its face 110 is secured to the output shaft 112 of the gear box for rotation therewith.

In addition to the components just described, the operating system 101 for split flap 22 includes a cam follower 114 designed to follow track 108, a double-armed crank 116 supported by a pivot pin 118 from the aileron hinge support 76 of wing 20, and a push rod actuator 120.

Cam follower (or roller) 114 is rotatably supported from the end of one integral crank arm 122 on a post 124; and the forward end of push rod 120 is pivotably fixed to the second, integral arm 126 of the crank by pivot member 127. A pivot member 128 fixes the opposite, trailing end of the push rod to the bifurcated arm 94 of the flap actuating crank 84.

To extend flap 22, the flap operating system 101 is actuated, causing drum 107 to rotate in a clockwise direction as shown in FIGS. 2 and 3. As this occurs, cam follower 114 travels along track 108 and causes crank 116 to rotate in a counterclockwise direction from the position shown in FIG. 2 to that shown in FIG. 3. This rotation of crank 116 displaces push rod 120 rearwardly, rotating flap actuating crank 84 in a clockwise direction about pivot member 88 to deflect flap 22 downwardly to its extended position (flap 22 has no intermediate positions, only fully extended and stowed). Similarly, rotation of torque tube extension 104 in the opposite direction effects a reversal of these motions and, as a consequence, deflection of the flap from the extended, FIG. 3 position to the stowed, FIG. 2 position.

As suggested above, the aerodynamic lifting or braking device incorporated in the wing illustrated in FIG. 1 may be a ground speed spoiler instead of a split flap. A braking device of that character is illustrated in FIGS. 6–8 and identified by reference character 130.

Figure 6:
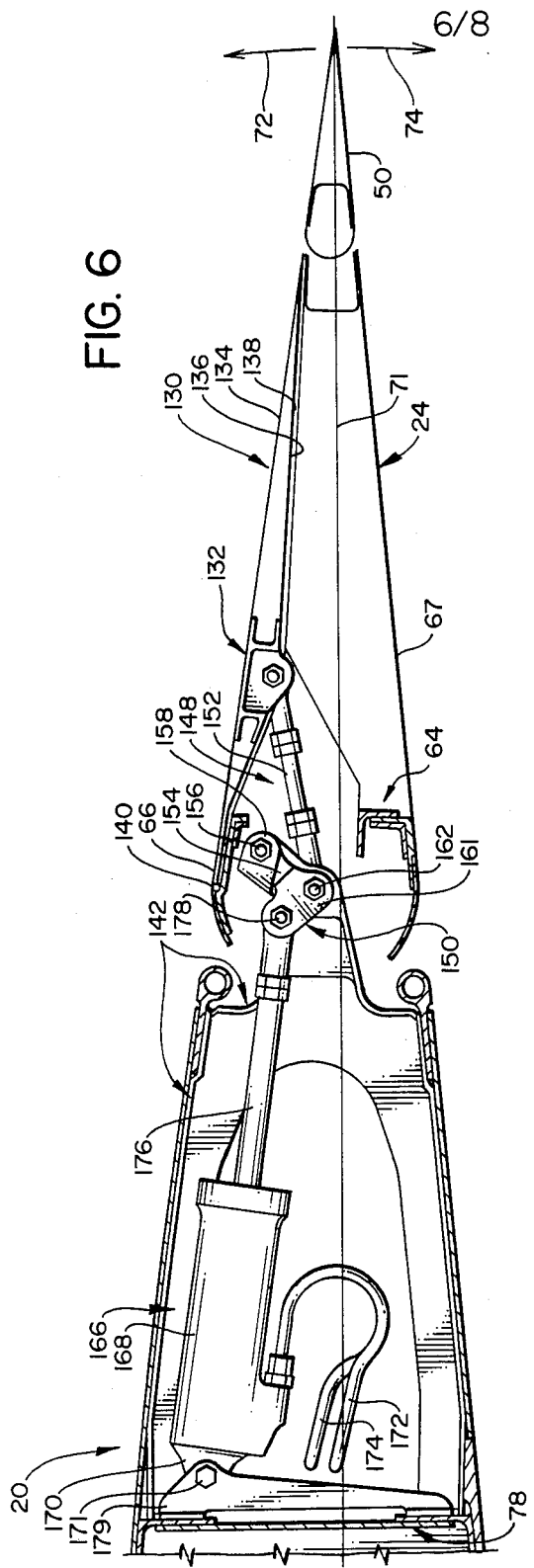
FIG. 6 is a view similar to FIG. 2 of a wing as shown in FIG. 1, the wing being equipped with a drag generating ground spoiler in accord with the principles of the present invention.
Figure 7:
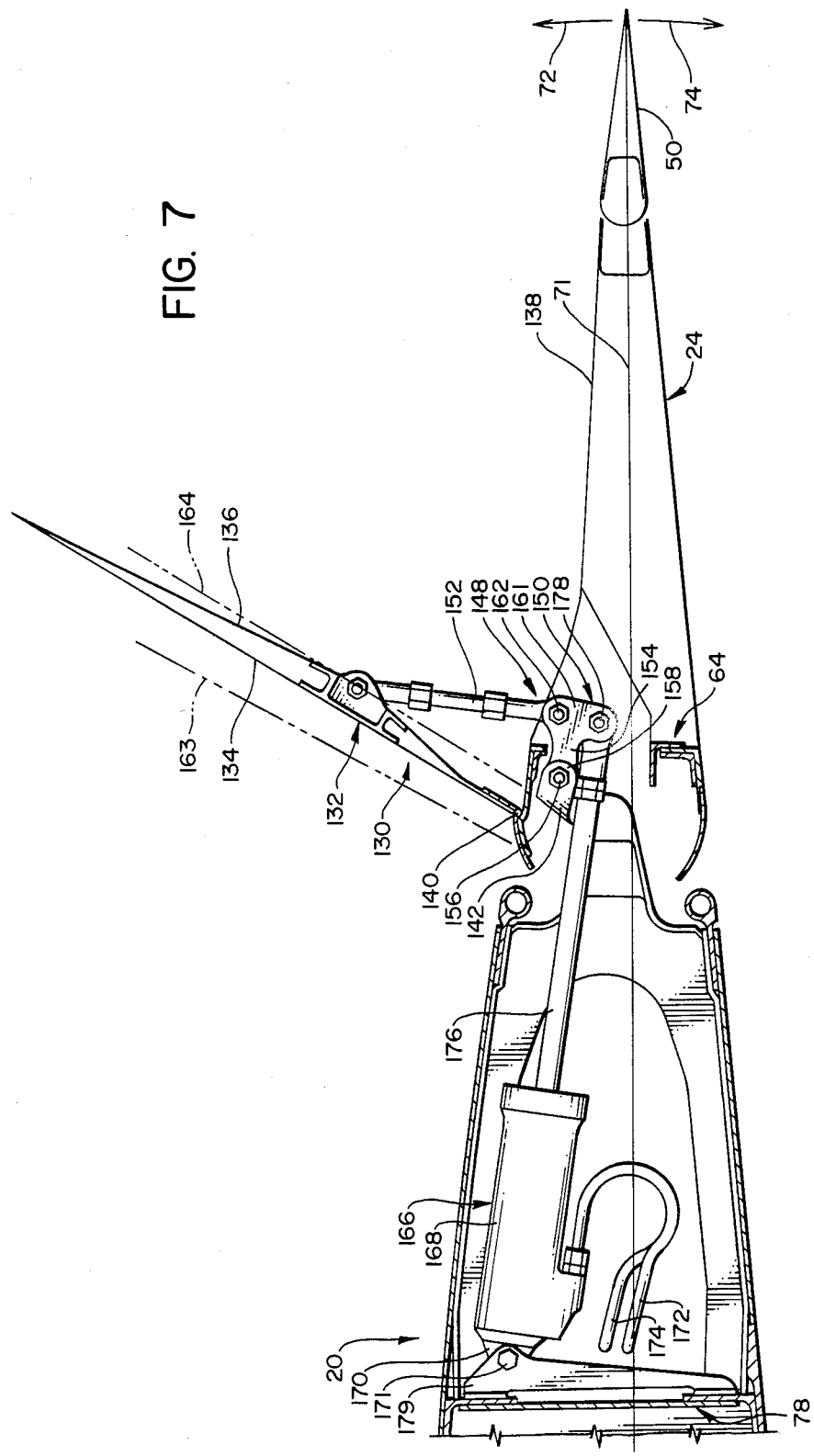
FIG. 7 is a view similar to FIG. 6 but with the spoiler in its extended position.

In many cases, the aircraft components and structure shown in FIGS. 6–8 duplicate what is shown in FIGS. 1–5. To the extent that this is true, like reference characters have been employed for like purposes.

Turning again to the drawing, FIGS. 6 and 7 depict, in detail, the novel aileron-mounted ground speed spoiler 130 which may be incorporated into wing 20 to increase the drag on the aircraft with which the wing is fitted.

Spoiler 130 has a structural framework or core identified generally in FIGS. 6 and 7 by reference character 132. This core is surrounded by a metallic or other upper skin 134 and a similar lower skin 136.

In its stowed position (FIG. 6), ground speed spoiler 130 is housed in a recess 138 in the upper side of aileron 24. With spoiler 130 thus stowed in recess 138, the upper skin 134 of the flap forms part of (or continues) the aerodynamic profile of aileron 24.

Ground speed spoiler 130 will typically have a constant chord and extend the length of aileron 24. At its leading edge, spoiler 130 is pivotably fixed to aileron 24 as by a conventional piano hinge 140.

Referring now to FIGS. 6–8, an assembly of aileron 24, spoiler 130, and aileron trim tab 50 is supported from the trailing edge of wing 20 for up and down angular movement (shown by arrows 72 and 74 in FIGS. 2 and 3) relative to the chord plane 71 of the wing from an aileron hinge support 142 which is much like the hinge support 76 described above. Hinge support 142 is mounted on the rear spar 78 of wing 20. A pin 144 (see FIG. 8) extends through hinge support 142 and the hinge lug 146 of the aileron (the aileron actuator and its support mechanism are not shown). The hinge lug is integrated with the core 64 of the aileron, and the just-described pin 144 consequently affords the wanted pivotal connection between aileron 24 and the win 20 in which that aileron is incorporated.

With spoiler 130 in the stowed position (FIG. 6) the pivot axis of aileron 24 relative to wing 20 is directly below the pivot axis between spoiler 130 and aileron 24 provided by piano hinge 140.

As can best be understood by reference to FIGS. 6–8, spoiler 130 is displaced between the stowed position shown in FIG. 6 and the extended, aerodynamic, ground speed braking position shown in FIG. 7 in which the spoiler is deployed above and at an angle to the chord plane 71 of wing 20 by a crank-and-rod type, spoiler actuating linkage or mechanism 148. That linkage includes a crank 150 and a spoiler support rod 152. At its free end, one arm 154 of crank 150 is pivotably fixed to aileron hinge support 142 by a pivot pin 156. The pin extends through integral flanges 158 and 160 at the trailing edge of support 142 and on opposite sides of crank arm 154 (through which pin 156 also extends).

Crank 150 also includes a second, bifurcated arm 161. The forward end of ground speed spoiler support rod 152 is pivotably connected to crank 150 at the juncture between that bifurcated arm and crank arm 154 by a pivot member or pin 162 best shown in FIGS. 6 and 7.

With spoiler 130 in the stowed position shown in FIG. 6, the pivot axis afforded by pin 162 is centered on (i.e., coincides with) the pivot axis for aileron 24 provided by pivot member or pin 144. Consequently, spoiler 130 rotates as one with aileron 24 as the latter is deflected upwardly and downwardly through the paths indicated by arrows 72 and 74 (FIG. 6).

To extend ground speed spoiler 130, crank 150 is rotated in a counterclockwise direction about pivot member 156 from the position shown in FIG. 6 to that shown in FIG. 7. This deflects spoiler 130 upwardly through an angle which will typically also be a nominal 60° relative to the chord plane 71 of wing 20.

In the extended position spoiler 130 will typically remain within 3° of the nominal angle as aileron 24 is moved upwardly and downwardly. However, because of the piano hinge connection 140 between spoiler 130 and aileron 24, the spoiler will translate to and fro as the aileron is moved. Broken lines 163 and 164 in FIG. 8 show the locations of the upper face or skin 134 of the spoiler with aileron 24 in its maximum (20° down and 20° up) positions.

Referring still to the drawings, FIGS. 6-8 depict the operating system 166 utilized to rotate crank 150 about pivot member 156 and thereby deflect ground speed spoiler 130 between its stowed and extended positions. This system includes a hydraulic cylinder 168 with its forward end 170 pivotably fixed to the rear spar 78 of wing 20 by support 179 and by pivot member 171.

Hydraulic lines 172 and 174 connect hydraulic cylinder 168 to the hydraulic power supply (not shown) for outboard ground spoilers 40 and 42, allowing the deflection of ground speed spoiler 130 to be coordinated with the deflection of these just-enumerated spoilers.

Cylinder 168 includes the usual rectilinearly displaceable piston rod 176. The trailing end of this rod is pivotably fixed to the free end of bifurcated spoiler actuating linkage crank arm 161 by a pivot pin or member 178. Consequently, admission of hydraulic fluid to the forward end of hydraulic cylinder 168 will result in: (1) piston rod 176 moving rearwardly; (2) crank 150 rotating in a counterclockwise direction from the position shown in FIG. 6 to that shown in FIG. 7; and (3) spoiler support rod 152 deflecting the ground speed spoiler 130 from its stowed position (FIG. 6) to its extended position (FIG. 7). Conversely, the subsequent reversal of the pressure in cylinder 168 will result in the reversal of the motions of the just-described actuating linkage and operating system components and the deflection of spoiler 130 to its stowed position.

It will be apparent to the reader that the invention may be embodied in specific forms other than those disclosed above without departing from the spirit or essential characteristics of the invention. The embodiments of the invention disclosed herein are therefore to be considered in all respects as illustrative and not restrictive. The scope of the invention is instead indicated by the appended claims, and all changes which come within the meaning and range of equivalency of the claims are therefore intended to be embraced therein.

I claim as my invention:

1. The combination of: an aircraft wing; an aileron extending along said wing at the rear edge thereof; stationary aileron support means fixed to said wing; pivot means fixing said aileron to said support means for pivotable movement about an axis extending spanwise of said wing; an aerodynamic lifting or braking means adapted to be displaced from a stowed position in which said lifting or braking means is butted against said aileron to an extended position in which the lifting or braking means is oriented at an angle relative to the chord plane of said wing to increase the lift or drag on the aircraft in which said wing is incorporated; means operable to position said aerodynamic lifting or braking means relative to said aileron support means for pivotable movement about the same axis extending spanwise of said wing as said aileron whereby, when the lifting or braking means is in its stowed position, said lifting or braking means and said aileron pivot together about said axis and said lifting or braking means thereby remains in its stowed position against said alieron as said aileron is displaced about said pivot axis; and an actuating mechanism for displacing said lifting or braking means as aforesaid from its stowed position to its extended position, said actuating mechanism for said lifting or braking means comprising: a two-armed crank, a second pivot means supporting said crank by the end of one arm thereof for pivotable movement about an axis extending parallel to the pivot axis provided by the first-mentioned pivot means, a push-pull actuator, means pivotably connecting one end of said actuator to the crank at the end of the second arm thereof, a link between said crank and said aerodynamic lifting or braking means, means pivotably connecting one end of said link to said lifting or braking means, and means pivotably connecting the opposite end of said link to said crank at a location intermediate the ends of the crank arms, the distance from the pivot axis between the crank and the aileron support means being such that the pivot axis between said crank and said link is essentially ooincidental with the pivot axis between said aileron and the aileron support means when said aerodynamic lifting or braking means is in its stowed position.

2. The combination of: an aircraft wing; an aileron with an airfoil shape extending along the trailing edge of said aircraft wing; stationary aileron support means fixed to said wing; first pivot means toward the leading edge of the aileron for pivotably fixing said aileron to said stationary aileron support means; an aerodynamic lifting or braking means which can be deployed at an angle to the chord plane of said wing to create lift and/or drag and thereby decrease aircraft approach speed and/or provide ground speed braking, said lifting or braking means having a stowed position in which it so fits into said aileron as to continue the airfoil shape of the aileron; second pivot means at the leading edge of said lifting or braking means for pivotably fixing said lifting or braking means to said aileron for displacement between the stowed position and the deployed position, the axis of said second pivot means being vertically aligned with the axis of the first pivot means when said lifting or braking means is stowed; and an actuating mechanism for rotatably displacing the lifting or braking means about the axis furnished by said second pivot means to displace said lifting or braking means between the stowed and extended positions, said actuating mechanism for said lifting or braking means comprising: a two-armed crank, said second pivot means supporting said crank by the end of one arm thereof for pivotable movement about an axis extending parallel to the pivot axis provided by the first-mentioned pivot means; a push-pull actuator; means pivotably connecting one end of said actuator to the crank at the end of the second arm thereof; a link between said crank and said aerodynamic lifting or braking means; means pivotably connecting one end of said link to said lifting or braking means; and means pivotably connecting the opposite end of said link to said crank at a location intermediate the ends of the crank arms, the distance from the pivot axis between the crank and the aileron support means being such that the pivot axis between said crank and said link is essentially coincidental with the pivot axis between said aileron and the aileron support means when said aerodynamic lifting or braking means is in its stowed position.

3. The combination defined in claim 2 wherein said lifting or braking means is a lifting means and is a split flap which fits into the lower side of the aileron when the flap is in its stowed position and wherein, with the flap in that position, the axis of said second pivot means lies directly below the axis of the first pivot means.

4. The combination defined in claim 2 wherein said lifting or braking means is a braking means and is a ground speed spoiler which fits into the upper side of the aileron when the spoiler is in its stowed position and wherein, with the spoiler in that position, the axis of said second pivot means lies directly above the axis of the first pivot means.

5. The combination of: an aircraft wing; an aileron with an airfoil shape extending along the trailing edge of said wing; means toward the leading edge of the aileron for pivotably fixing said aileron to said wing; operating means for displacing said aileron to up and down positions by rotating the aileron about the pivot axis between said aileron and said wing; aerodynamic lifting or braking means which can be deployed at an angle to the chord plane of the wing to create additional lift and/or drag on the aircraft in which said wing is incorporated and thereby decrease the approach speed of the aircraft and/or provide ground speed braking, said lifting or braking means having a stowed position in which it so fits into said aileron as to continue the airfoil shape of the aileron; means at the leading edge of said aerodynamic lifting or braking means for fixing said lifting or braking means to said aileron; and mechanism for so actuating said aerodynamic lifting or braking means that: (1) said aerodynamic lifting or braking means pivots with said aileron as the aileron is displaced to up and down positions when the lifting or braking means is in its stowed position, and (2) said aerodynamic lifting or braking means is translated to and fro as aileron is moved to up and down positions but is generally unaffected in its angular relationship to the chord plane of the wing by such movement of the aileron, said actuating mechanism for said lifting or braking means comprising: a two-armed crank, a second pivot means supporting said crank by the end of one arm thereof for pivotable movement about an axis extending parallel to the pivot axis provided by the first-mentioned pivot means, a push-pull actuator, means pivotably connecting one end of said actuator to the crank at the end of the second arm thereof, a link between said crank and said aerodynamic lifting or braking means, means pivotably connecting one end of said link to said lifting or braking means, and means pivotably connecting the opposite end of said link to said crank at a location intermediate the ends of the crank arms, the distance from the pivot axis between the crank and the aileron support means being such that the pivot axis between said crank and said link is essentially coincidental with the pivot axis between said aileron and the aileron support means when said aerodynamic lifting or braking means is in its stowed position.

6. The combination of: an aircraft wing; an aileron with an airfoil shape extending along the trailing edge of said wing; means toward the leading edge of the aileron for pivotably fixing said aileron to said wing; operating means for displacing said aileron to up and down positions by rotating the aileron about the pivot axis between said aileron and said wing; aerodynamic lifting or braking means which can be deployed to provide aerodynamic lift and/or drag on the aircraft in which the wing is incorporated and thereby decrease the approach speed of the aircraft and/or provide ground speed braking, said aerodynamic lifting or braking means having a stowed position in which it so fits into said aileron as to continue the airfoil shape of the aileron; means at the leading edge of said aerodynamic lifting or braking means for fixing said lifting or braking means to said aileron; and means for so actuating said aerodynamic lifting or braking means that: (1) said lifting or braking means pivots with said aileron as the aileron is displaced to up and down positions when the lifting or braking means is in its stowed position, and (2) said aerodynamic lifting or braking means remains in generally the same angular position relative to the chord plane of said wing irrespective of up and down displacements of said aileron when said lifting or braking means is in its deployed position; and a mechanism for displacing said aerodynamic lifting or braking means between its stowed and deployed positions, said actuating mechanism for said lifting or braking means comprising; a two-armed crank, a second pivot means supporting said crank by the end of one arm thereof for pivotable movement about an axis extending parallel to the pivot axis provided by the first-mentioned pivot means, a push-pull actuator, means pivotably connecting one end of said actuator to the crank at the end of the second arm thereof, a link between said crank and said aerodynamic lifting or braking means, means pivotably connecting one end of said link to said lifting or braking means, and means pivotably connecting the opposite end of said link to said crank at a location intermediate the ends of the crank arms, the distance from the pivot axis between the crank and the aileron support means being such that the pivot axis between said crank and said link is essentially coincidental with the pivot axis between said aileron and the aileron support means when said aerodynamic lifting or braking means is in its stowed position.

7. The combination of: an aircraft wing; an aileron extending along the trailing edge of said wing; stationary aileron support means fied to said wing; pivot means fixing said aileron to said support means for pivotable movement about an axis extending spanwise of said wing; aerodynamic lifting or braking means adapted to be displaced from a stowed position in which said lifting or braking means is housed in a recess in said aileron and continues the profile of the aileron to an extended position in which the lifting or braking means is oriented at an angle to the chord plane of said wing to increase the lift and/or drag on the aircraft in which said wing is incorporated; means fixing said aerodynamic lifting or braking means to said aileron for pivotal movement about a second axis extending spanwise of said wing; an actuating mechanism for rotating said lifting or braking means about said second pivot axis from said stowed position to said extended position, said actuating mechanism moving from a first configuration into a second configuration in the course of displacing said lifting or braking means from its stowed position to its extended position, and operating means for: (1) moving said actuating mechanism from its first configuration into its second configuration to thereby extend said lifting or braking means, and (2) immobilizing said actuating means in said second configuration despite any up and down movements of said aileron that may be affected while said lifting or braking means is in its extended position, said actuating mechanism for said lifting or braking means comprising: a two-armed crank, a second pivot means supporting said crank by the end of one arm thereof for pivotable movement about an axis extending parallel to the pivot axis provided by the first-mentioned pivot means, a push-pull actuator, means pivotably connecting one end of said actuator to the crank at the end of the second arm thereof, a link between said crank and said aerodynamic lifting or braking means, means pivotably connecting one end of said link to said lifting or braking means, and means pivotably connecting the opposite end of said link to said crank at a location intermediate the ends of the crank arms, the distance from the pivot axis between the crank and the aileron support means being such that the pivot axis between said crank and said link is essentially coincidental with the pivot axis between said aileron and the aileron support means when said aerodynamic lifting or braking means is in its stowed position.

8. The combination defined in any one of the preceding claims 1, 2, 5, 6, or 7 wherein said aerodynamic lifting or braking means is a lifting means and is a flap which is butted against the lower side of the aileron when the flap is in its stowed position and wherein the combination also includes means for operating said lifting means actuating mechanism, said operating means including: a second crank, said second crank having at least one arm; means supporting said second crank for rotation about an axis parallel to the pivot axis provided by the first pivot means; a rotatable cam member; a cam follower rotatably fixed to an arm of said second crank and cooperable with said cam member to rock said second crank about said parallel pivot axis as said cam member is rotated; and means for pivotably connecting the opposite end of the push-pull actuator to an arm of said second crank.

9. The combination defined in any one of the preceding claims 1, 2, 5, 6, or 7 wherein said aerodynamic braking or lifting means is a braking means and wherein the means for operating said aerodynamic braking means further comprises a hydraulic cylinder, said push-pull actuator being integrated with the piston rod of the hydraulic cylinder.

10. The combination defined in any of the preceding claims 1, 5, or 7 wherein said aerodynamic lifting or braking means is a lifting means which is a trailing edge flap and wherein the mechanism for displacing said lifting means to its extended position is arranged to rotate the flap downwardly relative to said wing.

11. The combination defined in any of the preceding claims 1, 5, or 7 wherein said aerodynamic lifting or braking means is a braking means which is a ground speed spoiler and wherein the means for displacing the spoiler to its extended position is arranged to rotate said flap upwardly relative to said wing.

* * * * *